US010113633B2

(12) United States Patent
Niergarth et al.

(10) Patent No.: US 10,113,633 B2
(45) Date of Patent: *Oct. 30, 2018

(54) GEARBOX PLANET SQUEEZE FILM DAMPER

(71) Applicant: General Electric Company, Schenectady, NY (US)

(72) Inventors: Daniel Alan Niergarth, Cincinnati, OH (US); Brandon Wayne Miller, Liberty Township, OH (US); Bugra Han Ertas, Niskayuna, NY (US); Donald Albert Bradley, Cincinnati, OH (US); Joseph Robert Dickman, Monroe, OH (US)

(73) Assignee: General Electric Company, Schenectady, NY (US)

( * ) Notice: Subject to any disclaimer, the term of this patent is extended or adjusted under 35 U.S.C. 154(b) by 197 days.

This patent is subject to a terminal disclaimer.

(21) Appl. No.: 15/008,907

(22) Filed: Jan. 28, 2016

(65) Prior Publication Data

US 2017/0219079 A1    Aug. 3, 2017

(51) Int. Cl.
| | |
|---|---|
| F16H 57/00 | (2012.01) |
| F02C 7/36 | (2006.01) |
| F16H 57/08 | (2006.01) |
| F16H 57/04 | (2010.01) |
| F16C 27/04 | (2006.01) |

(52) U.S. Cl.
CPC ........... *F16H 57/0006* (2013.01); *F02C 7/36* (2013.01); *F16C 27/045* (2013.01); *F16H 57/0471* (2013.01); *F16H 57/08* (2013.01); *F16H 57/082* (2013.01); *F05D 2260/40311* (2013.01); *F05D 2260/96* (2013.01); *F16H 2057/085* (2013.01)

(58) Field of Classification Search
CPC ............ F16H 57/0006; F16H 57/0471; F16H 57/082; F16H 2057/085; F16H 57/00; F02C 7/36; F16C 27/045
See application file for complete search history.

(56) References Cited

U.S. PATENT DOCUMENTS

| | | | |
|---|---|---|---|
| 4,214,796 A | * | 7/1980 | Monzel ................. F01D 25/164 |
| | | | 384/202 |
| 4,325,589 A | | 4/1982 | Hirt |

(Continued)

FOREIGN PATENT DOCUMENTS

| | | |
|---|---|---|
| CN | 1245863 A | 3/2000 |
| CN | 202674142 U | 1/2013 |

(Continued)

OTHER PUBLICATIONS

Extended European Search Report and Opinion issued in connection with corresponding EP Application No. 17152870.6 dated Jun. 9, 2017.

(Continued)

*Primary Examiner* — Huan Le
(74) *Attorney, Agent, or Firm* — General Electric Company; Pamela Kachur

(57) ABSTRACT

An epicyclic gearing arrangement includes a planet gear rotatable on a planet bearing that is mounted via a support pin to a carrier of the epicyclic gearing arrangement. A spring film damper is disposed between the cylindrical outer surface of the support pin and the opposing inner surface of the inner ring of the planet bearing and includes an annular gap.

18 Claims, 5 Drawing Sheets

(56) References Cited

U.S. PATENT DOCUMENTS

| | | | |
|---|---|---|---|
| 4,610,645 A | | 9/1986 | Donn et al. |
| 5,344,239 A | * | 9/1994 | Stallone ................ F01D 25/164 |
| | | | 384/99 |
| 6,183,388 B1 | | 2/2001 | Hawkins |
| 6,212,974 B1 | | 4/2001 | Van Duyn |
| 7,490,460 B2 | | 2/2009 | Moniz et al. |
| 8,182,153 B2 | * | 5/2012 | Singh .................... F01D 25/164 |
| | | | 384/477 |
| 8,256,750 B2 | | 9/2012 | Cottrell et al. |
| 8,272,786 B2 | | 9/2012 | Cottrell |
| 8,348,803 B2 | | 1/2013 | Matsuoka et al. |
| 8,398,525 B2 | | 3/2013 | Matsuoka et al. |
| 8,529,197 B1 | | 9/2013 | Coffin et al. |
| 8,561,501 B2 | | 10/2013 | Niggemeier et al. |
| 8,573,926 B2 | | 11/2013 | Coffin et al. |
| 8,585,538 B2 | | 11/2013 | Sheridan et al. |
| 8,747,272 B2 | | 6/2014 | Imai et al. |
| 8,827,633 B2 | | 9/2014 | Coffin et al. |
| 8,968,148 B2 | | 3/2015 | Matsuoka et al. |
| 9,033,653 B2 | | 5/2015 | Coffin et al. |
| 9,046,041 B2 | | 6/2015 | Rejman et al. |
| 9,677,659 B1 | | 6/2017 | Niergarth et al. |
| 2004/0065169 A1 | * | 4/2004 | Ciszak ................ B60K 17/046 |
| | | | 74/640 |
| 2013/0269479 A1 | | 10/2013 | Van der Merwe et al. |
| 2017/0219080 A1 | * | 8/2017 | Niergarth ................ F16H 48/36 |

FOREIGN PATENT DOCUMENTS

| | | |
|---|---|---|
| EP | 1 375 941 A1 | 1/2004 |
| SU | 1090941 A1 | 5/1984 |
| WO | 2015/055291 A1 | 4/2015 |

OTHER PUBLICATIONS

First Office Action and Search issued in connection with corresponding CN Application No. 201710056402.7 dated Mar. 9, 2018.

* cited by examiner

GEARBOX PLANET SQUEEZE FILM DAMPER

FIELD OF THE INVENTION

The present subject matter relates generally to a cylindrical roller bearing, or more particularly to a cylindrical roller bearing for the planet gear in an epicyclic gearbox in a gas turbine engine.

BACKGROUND OF THE INVENTION

A gas turbine engine generally includes a fan and a core arranged in flow communication with one another with the core disposed downstream of the fan in the direction of the flow through the gas turbine. The core of the gas turbine engine generally includes, in serial flow order, a compressor section, a combustion section, a turbine section, and an exhaust section. With multi-shaft gas turbine engines, the compressor section can include a high pressure compressor (HP compressor) disposed downstream of a low pressure compressor (LP compressor), and the turbine section can similarly include a low pressure turbine (LP turbine) disposed downstream of a high pressure turbine (HP turbine). With such a configuration, the HP compressor is coupled with the HP turbine via a high pressure shaft (HP shaft), and the LP compressor is coupled with the LP turbine via a low pressure shaft (LP shaft).

In operation, at least a portion of air over the fan is provided to an inlet of the core. Such portion of the air is progressively compressed by the LP compressor and then by the HP compressor until the compressed air reaches the combustion section. Fuel is mixed with the compressed air and burned within the combustion section to provide combustion gases. The combustion gases are routed from the combustion section through the HP turbine and then through the LP turbine. The flow of combustion gasses through the turbine section drives the HP turbine and the LP turbine, each of which in turn drives a respective one of the HP compressor and the LP compressor via the HP shaft and the LP shaft. The combustion gases are then routed through the exhaust section, e.g., to atmosphere.

The LP turbine drives the LP shaft, which drives the LP compressor. In addition to driving the LP compressor, the LP shaft can drive the fan through a power gearbox of an epicyclic gearing arrangement, which allows the fan to be rotated at fewer revolutions per unit of time than the rotational speed of the LP shaft for greater efficiency. The power gearbox rotatably supports a sun gear that is disposed centrally with respect to a ring gear and a plurality of planet gears, which are disposed around the sun gear and engage between the sun gear and the ring gear. The LP shaft provides the input to the epicyclic gearing arrangement by being coupled to the sun gear, while the fan can be coupled to rotate in unison with the carrier of the planet gears or with the ring gear, depending upon whether a star gearbox or a planetary gearbox is used. Each planet gear meshes with the sun gear and with the ring gear. One of the carrier or the ring gear may be held stationary, but not both of them. Each planet gear is rotatable on its own bearing that is mounted on a support pin housed within a planet gearbox, which is fixed to the peripheral region of the carrier of the epicyclic gearing arrangement. The shaft of the fan is rotatable on its own bearing that is housed in a sun gearbox, which is also called the power gearbox.

For any given gas turbine engine application, the planet gears are designed to provide a set reduction ratio between the rotational speed of the LP shaft and the rotational speed of the fan shaft. Because each planet gearbox that houses each planet gear is disposed within the flow path of the gas turbine engine, the challenge is to design on the one hand a reliable and robust planet gearbox that meets all flight conditions of the engine while on the other hand designing a planet gearbox that is compact sufficiently to fit inside the flow path in a way that does not require the entire engine size to be larger and heavier than otherwise would be needed in order to accommodate the planet gearbox.

Since a planetary gearbox is used as a speed reducer or increaser in transmitting power from component to component, gearbox efficiency is of primary importance. Various dynamic issues invariably will arise during the extended operation of the power gearbox. Accordingly, the ability of the bearings to tolerate and mitigate these dynamic issues can improve the capacity, life and reliability of the power gearbox and thereby lower the frequency of the engine maintenance. Additionally, providing proper lubrication and cooling to the planet bearings (i.e., the bearings that support rotation of the planet gear) that support the planet gears is necessary to maximize the life of the planet bearings and the load capacity of the planet bearings. Thus, any improvement in the tolerance of the bearings to deal with anticipated dynamic issues must not adversely affect proper lubrication and cooling to the planet bearing.

BRIEF DESCRIPTION OF THE INVENTION

Aspects and advantages of the invention will be set forth in part in the following description, or may be obvious from the description, or may be learned through practice of the invention.

In one exemplary embodiment of the present disclosure, a power gearbox of a gas turbine engine includes an epicyclic gearing arrangement that has at least two planet gears, each planet gear including a planet bearing that is a roller bearing having its own set of rollers that are supported on a carrier pin. Each roller bearing includes a squeeze film damper that is attached between the carrier pin and the inner ring of the roller bearing to provide both damping and under-race lubrication to the system. The LP shaft of a turbofan engine provides the rotational input to the power gearbox, and the output from the power gearbox is provided to rotate the fan shaft of the turbofan engine. In one implementation of this embodiment in a planetary arrangement, each planet gear has an outer ring that includes a gear tooth surface that meshes with a sun gear input and a stationary ring gear to impart an output of reduced rotational speed to the carrier of the planet gears. In another implementation of this embodiment in a star arrangement, each planet gear has an outer ring that includes a gear tooth surface that meshes with a sun gear input while the carrier is held stationary to impart an output of reduced rotational speed to the ring gear.

In another exemplary embodiment of the present disclosure, a power gearbox of a gas turbine engine includes an epicyclic gearing arrangement that has at least two planet bearings, each planet bearing including a roller bearing mounted on a carrier pin. Each roller bearing includes a squeeze film damper that is attached between the planet gear and the outer race of the roller bearing to provide both damping and lubrication to the system. The LP shaft of a turbofan engine provides the rotational input to the power gearbox, and the output from the power gearbox is provided to rotate the fan shaft of the turbofan engine. In one implementation of this embodiment in a planetary arrangement, each planet gear includes a gear tooth surface that meshes with a sun gear input and a stationary ring gear to impart an output of reduced rotational speed to the carrier of the planet gears. In another implementation of this embodiment in a star arrangement, each planet gear has a gear tooth surface that meshes with a sun gear input while the carrier is held stationary to impart an output of reduced rotational speed to the ring gear.

In a further exemplary embodiment of the present disclosure, a power gearbox of a gas turbine engine includes an epicyclic gearing arrangement that has at least two planet bearings, each planet bearing including a roller bearing mounted on a carrier pin. Each roller bearing includes an attenuation spring that is attached between the planet gear and the outer ring of the roller bearing to provide damping to the system. The LP shaft of a turbofan engine provides the rotational input to the power gearbox, and the output from the power gearbox is provided to rotate the fan shaft of the turbofan engine. In one implementation of this embodiment in a planetary arrangement, each planet gear has a gear tooth surface that meshes with a sun gear input and a stationary ring gear to impart an output of reduced rotational speed to the carrier of the planet gears. In another implementation of this embodiment in a star arrangement, each planet gear has a gear tooth surface that meshes with a sun gear input while the carrier is held stationary to impart an output of reduced rotational speed to the ring gear.

In another exemplary embodiment of the present disclosure, a gas turbine engine includes a compressor section having at least one compressor and a turbine section located downstream of the compressor section and including at least one turbine. The compressor section can include a low pressure compressor and a high pressure compressor downstream of the low pressure compressor. The turbine section includes a high pressure (HP) turbine and a low pressure (LP) turbine downstream of the HP turbine. The gas turbine engine also includes a low pressure shaft mechanically coupling the low pressure compressor to the low pressure turbine via an epicyclic gearing arrangement, which includes a power gearbox that includes two or more planet gears, each planet gear being rotatably supported by a respective planet bearing assembly as summarily described above and in more detail hereinafter.

Each of the above exemplary embodiments of the present disclosure adds damping to the system in a very compact and efficient manner by incorporating the squeeze film damper or the attenuation spring directly into the planet bearing itself. Each of these embodiments maximizes the bearing's dynamic tolerance capability to maximize the bearing's load capacity, reliability and useful life without compromising the effectiveness of the lubrication and cooling of the planet bearing. Thus, each embodiment improves the engine's time in active service.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF ILLUSTRATIVE EMBODIMENTS

Figure 1:
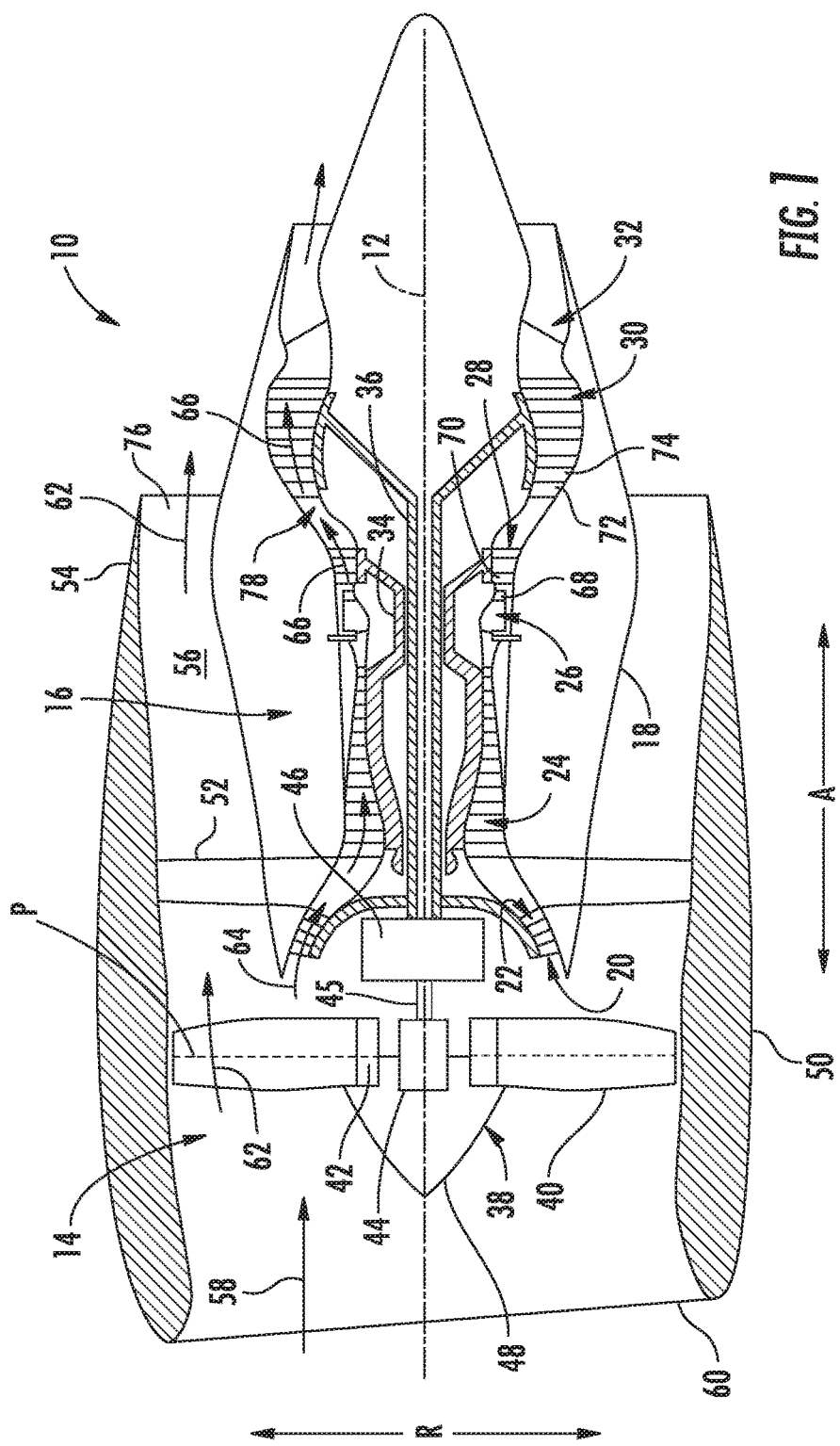
FIG. 1 is a schematic cross-sectional view of an exemplary gas turbine engine according to various embodiments of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or relative importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows. As used herein, the fluid can be a gas such as air or a liquid such as a lubricant.

Referring now to the drawings, wherein identical numerals indicate the same elements throughout the drawings, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference) and a radial direction R that is normal to the axial direction A. In general, the turbofan 10 includes a fan section 14 and a core turbine engine 16 disposed downstream from the fan section 14.

The exemplary core turbine engine 16 depicted generally includes a substantially tubular outer casing 18 that defines an annular inlet 20. As schematically shown in FIG. 1, the outer casing 18 encases, in serial flow relationship, a compressor section including a booster or low pressure (LP) compressor 22 followed downstream by a high pressure (HP) compressor 24; a combustion section 26; a turbine section including a high pressure (HP) turbine 28 followed downstream by a low pressure (LP) turbine 30; and a jet exhaust nozzle section 32. A high pressure (HP) shaft or spool 34 drivingly connects the HP turbine 28 to the HP compressor 24 to rotate them in unison. A low pressure (LP)

shaft or spool 36 drivingly connects the LP turbine 30 to the LP compressor 22 to rotate them in unison. The compressor section, combustion section 26, turbine section, and nozzle section 32 together define a core air flowpath.

For the embodiment depicted in FIG. 1, the fan section 14 includes a variable pitch fan 38 having a plurality of fan blades 40 coupled to a disk 42 in a spaced apart manner. As depicted in FIG. 1, the fan blades 40 extend outwardly from the disk 42 generally along the radial direction R. Each fan blade 40 is rotatable relative to the disk 42 about a pitch axis P by virtue of the fan blades 40 being operatively coupled to a suitable actuation member 44 configured to collectively vary the pitch of the fan blades 40 in unison. The fan blades 40, disk 42, and actuation member 44 are together rotatable about the longitudinal axis 12 via a fan shaft 45 that is powered by the LP shaft 36 across a power gear box 46. The power gear box 46 includes a plurality of gears for adjusting the rotational speed of the fan shaft 45 and thus the fan 38 relative to the LP shaft 36 to a more efficient rotational fan speed.

Referring still to the exemplary embodiment of FIG. 1, the disk 42 is covered by a rotatable front hub 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. It should be appreciated that the nacelle 50 may be configured to be supported relative to the core turbine engine 16 by a plurality of circumferentially-spaced outlet guide vanes 52. Alternatively, the nacelle 50 also may be supported by struts of a structural fan frame. Moreover, a downstream section 54 of the nacelle 50 may extend over an outer portion of the core turbine engine 16 so as to define a bypass airflow groove 56 therebetween.

During operation of the turbofan engine 10, a volume of air 58 enters the turbofan 10 through an associated inlet 60 of the nacelle 50 and/or fan section 14. As the volume of air 58 passes across the fan blades 40, a first portion of the air 58 as indicated by arrow 62 is directed or routed into the bypass airflow groove 56, and a second portion of the air 58 as indicated by arrow 64 is directed or routed into the upstream section of the core air flowpath, or more specifically into the inlet 20 of the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where the highly pressurized air is mixed with fuel and burned to provide combustion gases 66.

The combustion gases 66 are routed into and expand through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed into and expand through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and rotation of the fan 38 via the power gearbox 46.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow groove 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

It should be appreciated, however, that the exemplary turbofan engine 10 depicted in FIG. 1 is by way of example only, and that in other exemplary embodiments, the turbofan engine 10 may have any other suitable configuration. For example, in other exemplary embodiments, the fan 38 may be configured in any other suitable manner (e.g., as a fixed pitch fan) and further may be supported using any other suitable fan frame configuration. Moreover, it also should be appreciated that in other exemplary embodiments, any other suitable LP compressor 22 configuration may be utilized. It also should be appreciated, that in still other exemplary embodiments, aspects of the present disclosure may be incorporated into any other suitable gas turbine engine. For example, in other exemplary embodiments, aspects of the present disclosure may be incorporated into, e.g., a turboshaft engine, turboprop engine, turbocore engine, turbojet engine, etc.

Figure 2:
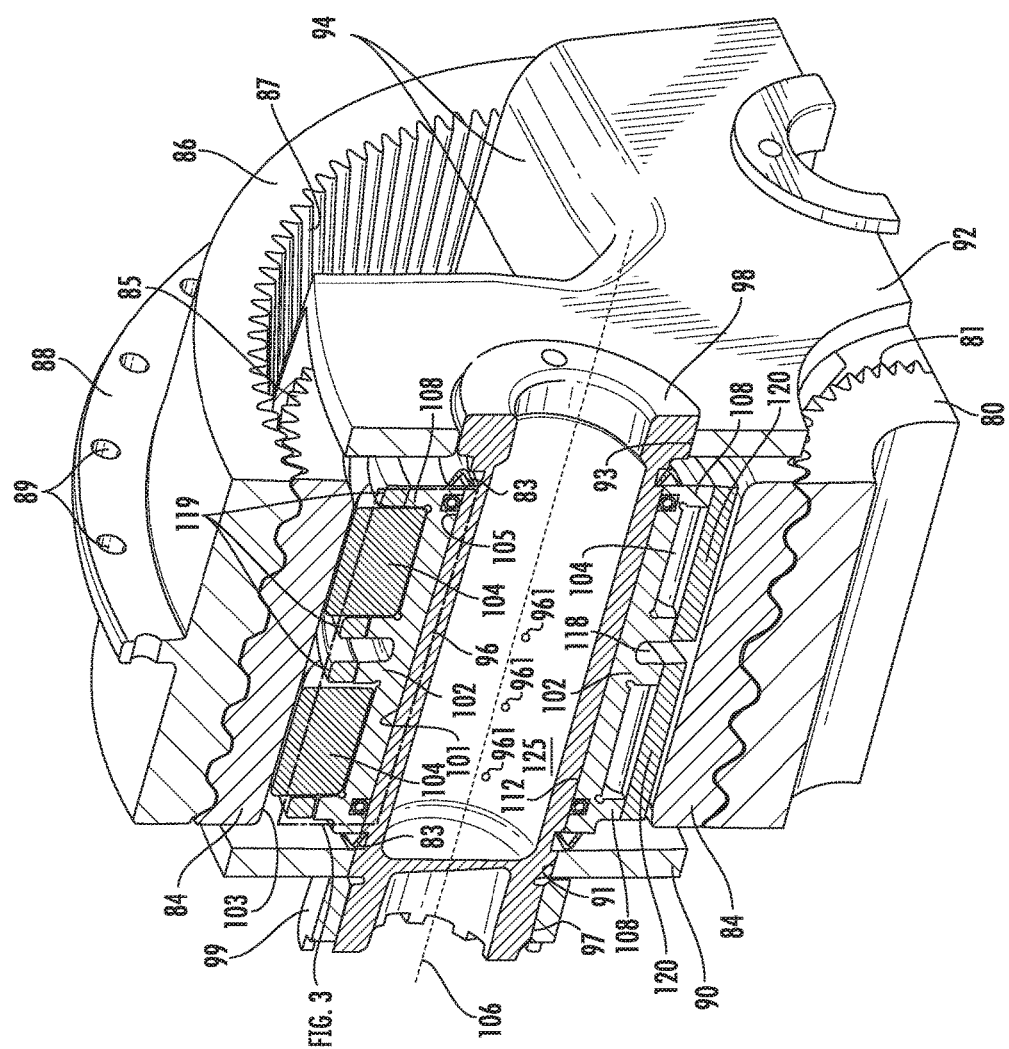
FIG. 2 is a view partially in perspective and partially in cross-section of components of a one quarter segment of an epicyclic gearing arrangement between the fan shaft and the LP shaft of the exemplary gas turbine engine of FIG. 1.
Figure 4:
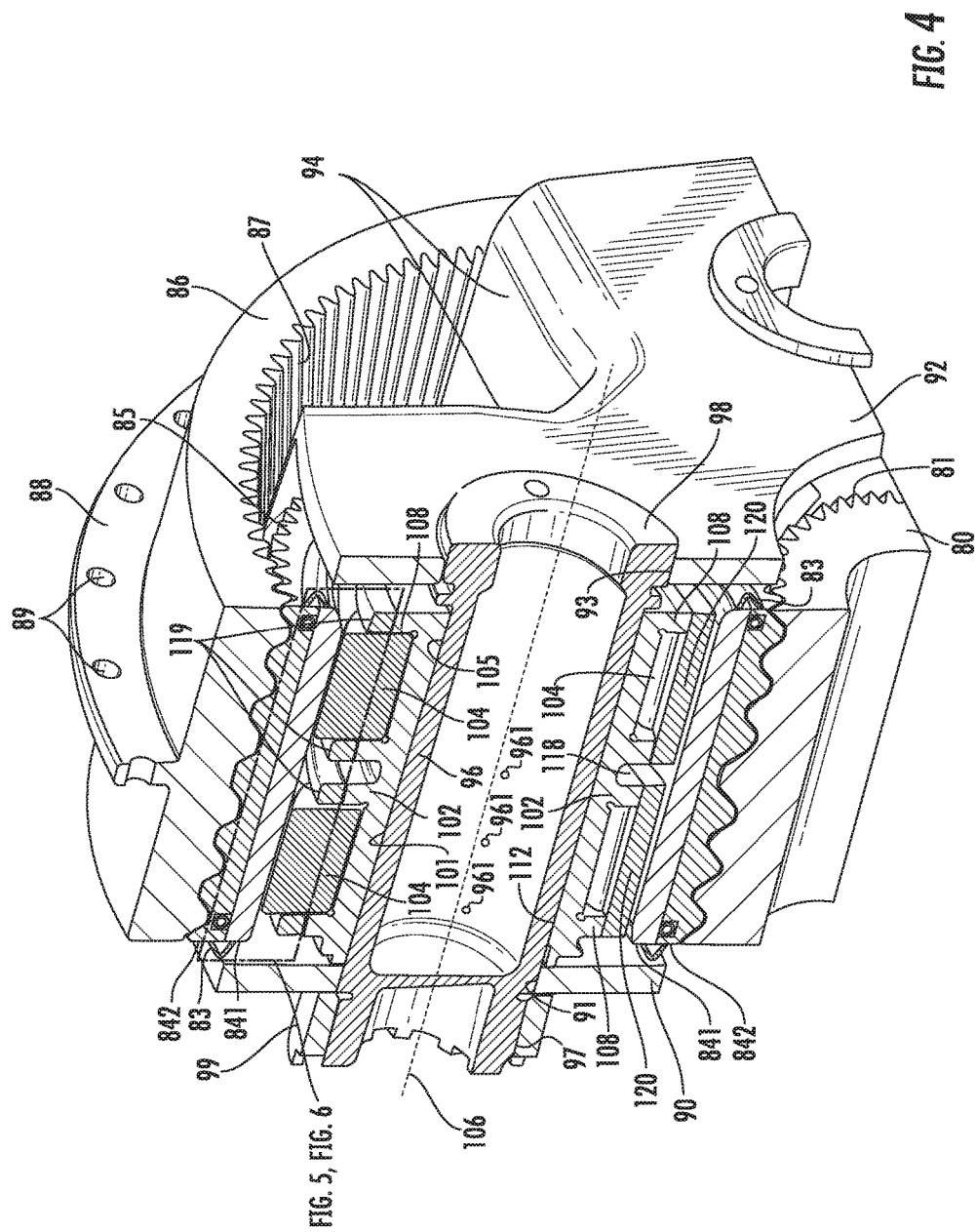
FIG. 4 is a view partially in perspective and partially in cross-section of components of a one quarter segment of another embodiments of an epicyclic gearing arrangement between the fan shaft and the LP shaft of the exemplary gas turbine engine of FIG. 1.

As schematically shown in FIGS. 2 and 4 for example, the power gearbox 46 desirably is an epicyclic gearing arrangement having a ring gear 86 that is disposed circumferentially around the sun gear 80 and the planet gears 84. As schematically shown in FIG. 1, the centrally-located sun gear 80 is rotatable about the longitudinal axis 12 shown in FIG. 1. As the bearing that rotationally supports the sun gear 80 is not the focus of the present disclosure, it has been omitted from the drawings.

As schematically shown in FIGS. 2 and 4 for example, a one-quarter section of the sun gear 80 is shown and each of the planet gears 84 meshes with both the ring gear 86 and the sun gear 80, which desirably has a double-helical pattern of gear teeth 81. Accordingly, each planet gear 84 desirably has a double helical pattern of gear teeth 85 that are configured to mesh with the gear teeth 81 of the sun gear 80, and thus the ring gear 86 also desirably has a double helical pattern of gear teeth 87 configured to mesh with the teeth 85 of each planet gear 84. Collectively, the sun gear 80, the planet gears 84, and the ring gear 86 constitute a gear train, and these gears 80, 84, 86 may be made from steel alloys.

As schematically shown in FIGS. 2 and 4 for example, a carrier 90, 92, 94 surrounds the sun gear 80, which is rotatable with respect to the carrier. The carrier carries at least one planet gear 84 and desirably an annular array of planet gears 84, with cut-away portions of two planet gears 84 being visible in FIGS. 2 and 4, each of which is rendered partly in a perspective view and partly in a cross-sectional view. In the illustrated example of the power gearbox 46 (FIG. 1) there are four planet gears 84 but varying numbers of planet gears 84 may be used.

As schematically shown in FIGS. 2 and 4 for example, the carrier includes a forward wall 90 and an aft wall 92 spaced axially apart from the forward wall 90 and together forming part of the carrier of each planet gearbox. As schematically shown in FIGS. 2 and 4, each of the forward wall 90 and the aft wall 92 respectively defines therethrough a respective coaxial bore 91 and 93. As schematically shown in FIGS. 2 and 4, the carrier desirably includes a plurality of sidewalls 94 that extend axially between and connect the forward and aft walls 90, 92 of the carrier. Desirably, pairs of the sidewalls 94 are disposed on opposite sides of the coaxial bores 91, 93 defined respectively in the respective forward and aft walls 90, 92 of the carrier.

A first exemplary embodiment of an epicyclic gearing arrangement contemplated herein desirably employs a planetary configuration (the rotational axes of the planets gears 84 rotate around the rotational axis of the sun gear 80) that has only a single input and a single output, and the ring gear 86 that surrounds the sun gear 80 and the planet gears 84 is rendered stationary by being coupled to the outer casing 18 in a manner that is not illustrated in the drawings, as this particular arrangement can be performed in any of a number of conventional manners, any one of which being suitable for purposes of illustrating exemplary embodiments of the present disclosure. For example, the ring gear 86 can be fixed (as by being mechanically bolted or welded) to the outer casing 18 via a central circumferential flange 88 that is drilled with a plurality of axial holes 89 therethrough as shown in FIGS. 2 and 4 for example. In this planetary configuration, the sun gear 80 is turned by an input that is the LP shaft 36 (FIG. 1), while the carrier (90, 92, 94 in FIGS. 2 and 4) that carries the planet gearboxes is coupled to a mechanical load that is the fan shaft 45 shown in FIG. 1. In this exemplary planetary configuration, the carrier is non-rotatably coupled to the fan shaft 45 in a conventional manner so that they rotate in unison at the same speed, but the manner of this coupling is not critical to an understanding of the present disclosure and thus need not be further discussed. Thus, in this exemplary embodiment, the power gearbox 46 is effective to reduce the rotational speed of the sun gear 80 (which rotates at the speed of the LP shaft) in a known manner to a rotational speed appropriate for the load coupled to the carrier, namely, rotation of the fan shaft 45.

A second exemplary embodiment of an epicyclic gearing arrangement contemplated herein desirably employs a star configuration (the ring gear 86 rotates around the sun gear 80 while the rotational axes of the planet gears 84 remain fixed with respect to the rotational axis of the sun gear 80), and it is the ring gear 86 that is non-rotatably coupled to the fan shaft 45 in a conventional manner so that they rotate in unison at the same speed. However, as noted above in the planetary gear embodiment, the manner of this coupling is likewise not critical to an understanding of the present disclosure and thus need not be further discussed. In this alternative exemplary embodiment employing a star configuration of an epicyclic gearing arrangement, it is the carrier that is coupled to the outer casing 18, and the specifics of this coupling also are not needed for the explanation of the desired aspects of the present invention.

However, in both embodiments (planetary and star), and as schematically shown in FIGS. 2 and 4 for example, the ring gear 86 is rotatably enmeshed with each planet gear 84, and each of the planet gears 84 is rotatably carried by a bearing that in turn is carried by a planet gearbox that in turn is carried by the carrier 90, 92, 94. The construction and mounting of the bearing for one planet gear 84 will be described with the understanding that each of the planet gears 84 is constructed and mounted identically, though to different points on the carrier 90, 92, 94.

Figure 3:
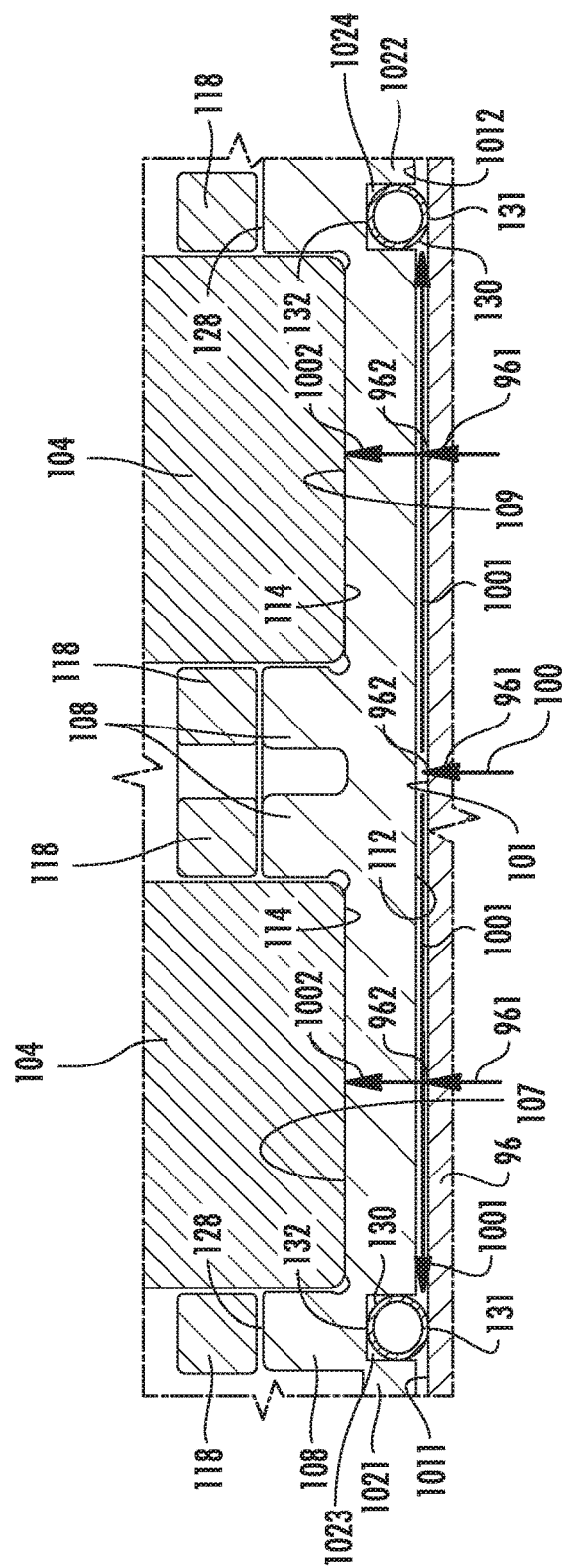
FIG. 3 is a schematic cross-sectional view of some of the components taken within the chain-dashed rectangle designated FIG. 3 in FIG. 2.

As shown in FIGS. 2, 3 (partially) and 4 for example, a support pin 96 is a body that is hollow, generally cylindrical, and defines a cylindrical outer surface 101. As schematically shown in FIGS. 2 and 4 for example, the cylindrical outer surface 101 of the support pin 96 is disposed radially equidistant from a virtual central axis 106 that extends in an axial direction through the support pin 96. This virtual central axis 106 also defines the axis of rotation for the planet gear 84. As schematically shown in FIGS. 2 and 4 for example, the support pin 96 is further defined as a body by an inner surface 125 disposed opposite the cylindrical outer surface 101. In the embodiments depicted in FIGS. 2 and 4 for example, the inner surface 125 is cylindrical with a transverse shape that is circular, and thus the inner surface 125 desirably is disposed concentrically with respect to the cylindrical outer surface 101.

As schematically shown in FIGS. 2, 3 (partially) and 4 for example, the support pin 96 has a forward end spaced apart from and in opposition from in the axial direction, an aft end of the support pin 96. As shown in FIGS. 2 and 4 for example, the forward end of the support pin 96 is completely closed off by a forward wall 95 that defines part of an internal cavity defined in the support pin 96. Though only half of the forward wall 95 is visible in the cross-sectional view depicted in FIGS. 2 and 4, this forward wall 95 extends completely across the forward end of the support pin 96.

The support pin 96 is provided to mount the bearing of the planet gear 84 to the carrier 90, 92, 94 and thus is configured to be fixed non-rotatably with respect to the carrier. As shown in FIGS. 2 and 4 for example, each opposite end (forward and aft) of the support pin 96 is received in a respective one of the bores 91 and 93 defined in the carrier 90, 92, 94 and held non-rotatably therein as by being press-fit for example. As shown in FIGS. 2 and 4 for example, the forward end of the support pin 96 includes a threaded, reduced-diameter surface 97, while the aft end includes an annular, radially-outwardly-extending flange 98. A retainer 99 (in this example a threaded locknut) engages the reduced-diameter surface 97 at the forward end to secure the support pin 96 in position against rearward axial movement.

As schematically shown by the arrows designated by the numerals 961 in FIG. 3 for example, the support pin 96 desirably includes a plurality of oil feed holes 961 formed therethrough. Each oil feed hole 961 extends through the support pin 96 between the cylindrical inner surface 125 and the cylindrical outer surface 101 of the support pin 96. As schematically shown in FIG. 3 for example, each oil feed hole 961 desirably extends in a radial direction from the cylindrical inner surface 125 to the cylindrical outer surface 101 of the support pin 96. As schematically shown in FIG. 3 for example, each oil feed hole 961 defines an exit opening 962 at the outer surface 101 of the support pin 96. These feed holes 961 are sized to meter a controlled flow of oil for lubricating and cooling the planet bearing.

In operation, oil is fed under pressure in any conventional manner through the opening at the aft end of the support pin 96 and into the internal cavity of the hollow support pin 96 defined in part by the forward wall 95 disposed opposite the opening at the aft end of the support pin 96 and shown in FIGS. 2 and 4 for example. The oil entering this internal cavity of the support pin 96 flows under pressure from the internal cavity as schematically represented in FIG. 3 by the arrow designated 100 and radially outwardly through such oil feed holes 961. In a dual track embodiment of the planet bearing shown in FIGS. 2 and 4 for example, there typically would be provided four oil feed holes 961 disposed circumferentially around the support pin and equidistantly apart from one another (90 degree intervals) for each of the tracks of the planet bearing. However, only one of these four holes 961 for each of the two tracks is visible in the view of FIG. 3. As the pressure at which this oil is provided to the hollow oil cavity defined by the cylindrical inner surface 125 of the support pin 96 can vary according to the particular planet gear 84 and engine 10, the oil feed holes 961 through the support pin 96 will be sized accordingly in order to ensure the proper flow rate of the oil at the available oil pressure in order to supply adequate lubrication and cooling to the planet bearing. With oil pressure within the internal cavity of the support pin of around 65 pounds per square inch, each of the four oil feed holes 961 for each track desirably would have a diameter of about 0.039 inch to yield an oil flow of about 1.1 gallons per minute being metered from the internal cavity of the support pin 96 to the planet bearing.

As described more fully below, the oil flows out of the exit openings 962 and into an annular gap of a squeeze film damper (described below). This annular gap extends both radially and axially between the outer surface 101 of the support pin 96 and the inner surface 112 of the inner ring 102 (described below). As schematically represented by the arrows and thick black lines designated 1002 in FIG. 3, the flow of oil from the annular gap of the squeeze film damper provides both cooling and lubrication to the rollers 104 and cage of planet bearing.

Figure 5:
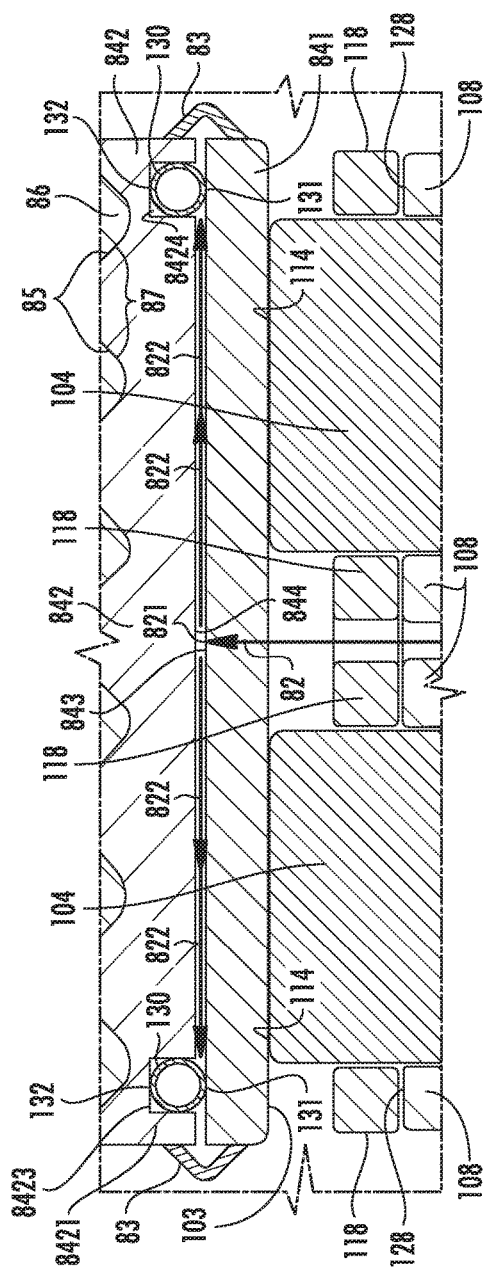
FIG. 5 is a schematic cross-sectional view of one embodiment of some of the components taken within the chain-dashed rectangle designated FIG. 5 in FIG. 4.
Figure 6:
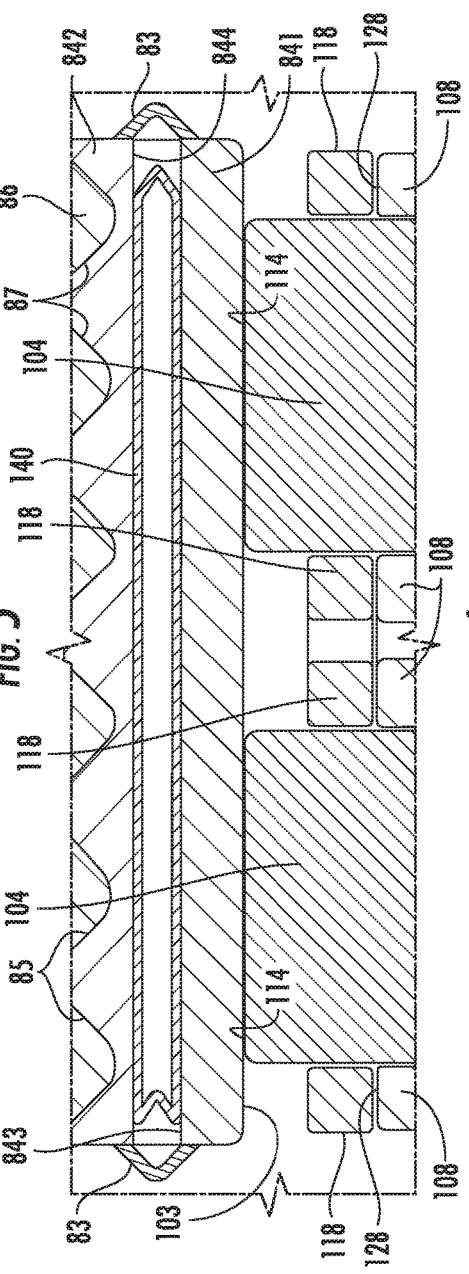
FIG. 6 is a schematic cross-sectional view of another embodiment of some of the components taken within the chain-dashed rectangle designated FIG. 6 in FIG. 4.

As shown in FIGS. 2, 3, 4, 5 and 6 for example, the planet bearing includes an inner ring 102, though only parts of the guiderails 108 defining the tracks of the inner ring 102 are visible in the views shown in FIGS. 5 and 6. Each of FIGS. 2 and 4 depicts a schematic representation of a half section of an inner ring 102 that is partially a perspective view and partially a cross-sectional view. As shown in FIGS. 2, 3 and 4 for example, the inner ring 102 defines a cylindrical inner surface 112. As schematically shown in FIG. 3 for example, the cylindrical inner surface 112 of the forward end 1021 of inner ring 102 is non-rotatably connected to the forward end 1011 of the cylindrical outer surface 101 of the support pin 96. Similarly, the aft end 1022 of inner ring 102 is non-rotatably connected to the aft end 1012 of the cylindrical outer surface 101 of the support pin 96. Thus, the inner ring 102 and the support pin 96 of the planet bearing are two separate components that are non-rotatably connected together at their opposite ends and disposed concentrically with respect to one another, though spaced apart from one another to define an annular gap that extends both radially and axially between the respective opposite ends of the inner ring 102 and the support pin 96. Each of these non-rotatable attachment elements is schematically represented by the feature identified by the numeral 83 in FIG. 2 for example and welding or mechanical fasteners or other conventional means of non-rotatable connection can be employed to secure the inner ring 102 to the support pin 96.

The planet bearing desirably is inner-race-guided and formed as a single, unitary component. As shown in FIG. 3 for example, the single component inner ring 102 desirably has disposed opposite the inner surface 112 thereof, an outer surface that defines at least one roller track that defines at least one roller raceway 107 or 109 constituting an inner race of the planet bearing. As contemplated herein, the inner ring 102 can include a single track or a plurality of tracks such as a dual track inner ring 102 or a triple track inner ring 102, etc. However, explanation of the structure and operation of the planet gearbox herein will use the specific example of a dual track inner ring 102, thus informing how additional tracks would be accommodated or a single track would remain after the elimination of one of the dual tracks.

As shown in FIGS. 2 and 4 for example, each respective track is defined by a pair of guiderails 108, which are spaced apart from each other in the axial direction and extend circumferentially around the inner ring 102. Accordingly, in a dual track embodiment, the outer surface of the inner ring 102 incorporates two pairs of guiderails 108, which extend continuously in the circumferential direction around the inner ring 102. Each of the roller raceways 107, 109 functions as an inner race 107, 109 of the dual track planet bearing. Each pair of guiderails 108 defines one of the two annular inner races 107, 109, a forward raceway 107 and an aft raceway 109, respectively, axially spaced apart from each other.

Each of the pair of tracks defines a surface in the form of a raceway 107 or 109 that extends circumferentially and concentrically with respect to the cylindrical inner surface 112 of the of the inner ring 102. Thus, each track includes a respective raceway 107, 109 that provides the surface that contacts the cylindrical outer surface 114 (FIG. 3) of each of the plurality of rollers 104, which are rotatably disposed within the respective track of the inner ring 102. The use of a single inner ring 102 with dual raceways 107, 109 spaced axially apart from each other provides for good concentricity between sets of rollers 104, but two separate inner rings 102 could be used as well. The axial dimension of the inner ring 102 desirably is sized so that the inner ring 102 cannot move axially relative to the opposing and axially spaced apart walls 90, 92 of the carrier.

As schematically shown in FIG. 3 for example, each guiderail 108 includes an exterior surface 128 that extends continuously in the circumferential direction around the outer surface 113 of the inner ring 102 and is disposed radially outwardly from a respective annular raceway 107, 109 defined in the outer surface of the inner ring 102. The exterior surface 128 of each guiderail 108 defines the largest diametric dimension of the outer surface of the inner ring 102 and provides respective guiding surfaces to each respective siderail 118 that extends circumferentially as part of the roller cage for each of the tracks.

In the embodiments shown in FIGS. 2 and 3, a squeeze film damper is disposed between the outer surface 101 of the support pin 96 and the inner surface 112 of the inner ring 102. Referring to the embodiments depicted in FIGS. 2 and 3, as noted above, each of the inner cylindrical surfaces 112 of the front portions of the forward end 1021 and the aft portions of the aft end 1022 of the inner ring 102 is disposed non-rotatably in opposition in the radial direction with respect to the respective front portions of the forward end 1011 and the aft portions of the aft end 1012 of the cylindrical outer surface 101 of the support pin 96. Thus, the inner ring 102 and the support pin 96 of the planet bearing are two separate components that are non-rotatably connected together at their opposite ends and disposed concentrically with respect to one another, though spaced apart from one another to define an annular gap that extends both radially and axially between the respective opposite ends of the inner ring 102 and the support pin 96. Each of these non-rotatable attachment elements is schematically represented by the feature identified by the numeral 83 in FIG. 2 for example.

However, the rear portion of forward end 1021 of the inner ring 102 is defined by a forward groove 1023 that extends circumferentially with respect to the virtual central axis 106 and forms the forward end of the squeeze film damper that is disposed between the outer surface 101 of the support pin 96 and the inner surface 112 of the inner ring 102. Similarly, the front portion of aft end 1022 of the inner ring 102 is defined by an aft groove 1024 that extends circumferentially with respect to the virtual central axis 106 and forms the aft end of the squeeze film damper that is disposed between the outer surface 101 of the support pin 96 and the inner surface 112 of the inner ring 102. As shown in FIG. 3, each of the forward groove 1023 and the aft groove 1024 defines a radial depth that extends from the inner surface 112 of the inner ring 102 in a direction radially away from the virtual central axis 106 of the planet bearing.

As shown in FIG. 3, the squeeze film damper further includes a forward resilient seal 130 disposed within the forward groove 1023 and an aft resilient seal 130 disposed within the aft groove 1024. Each resilient seal 130 desirably is a hollow tubular element formed into a continuous "O"-ring having a circular cross-section in its uncompressed state. The wall that defines the hollow tubular element has concentric inner and outer surfaces that also desirably have a circular cross-section in the uncompressed state of the resilient seal 130 which in the embodiment shown in FIGS. 3 and 5 is a toroidal seal. However, the resilient seal 130 need only have a cross-sectional shape which provides a resilient characteristic in the radial direction. For example, a split piston ring with a lap joint and having a solid rectangular cross-section rather than the hollow toroidal cross-section of the O-rings 130 depicted in FIGS. 3 and 5 also provides a desirable resilient seal 130. Some other alternative examples to the resilient seal 130 with the toroidal cross-section include those having a cross-section with either "Z", "C", "I", or "T" shapes. The geometry of the resilient seal's cross section, such as the material thickness, angle of the webs, fillet radii, etc., may be selected to provide desired stiffness characteristics for the resilient seal 130.

Each of the forward resilient seal 130 and the aft resilient seal 130 defines an inner diameter 131 and an outer diameter 132 that is larger than the inner diameter such that the difference between the inner diameter and the outer diameter of the respective resilient seal defines the uncompressed thickness in the radial direction of the respective resilient seal 130. In the cross-sectional view shown in FIGS. 3 and 5, the point on the respective resilient seals 130 that is contained as one of the endpoints of the inner diameter of the resilient seal 130 is designated by the numeral 131. Similarly, the point on the respective resilient seals 130 that is contained as one of the endpoints of the outer diameter of the resilient seal 130 in the cross-sectional view shown in FIGS. 3 and 5 is designated by the numeral 132. Accordingly, the uncompressed radial thickness of the each respective resilient seal 130 is greater than the radial depth of the respective groove 1023, 1024 in which the respective resilient seal 130 is disposed. In this way, when the respective resilient seals 130 are in their uncompressed states, the squeeze film damper provides an annular gap, mentioned above, that is disposed between the outer surface 101 of the support pin 96 and the inner surface 112 of the inner ring 102. The resilient seals 130 resiliently bear against the inner ring 102 and seal off the forward and aft ends of the annular gap, and also provide a radial centering force on the planet bearing that urges the inner ring 102 into a position coaxial with the support pin 96.

Any material with appropriate stiffness and fatigue life may be used to construct the resilient seals 130. The geometry of the resilient seal 130 cross section, such as the wall thickness, diameter, etc., may be selected to provide desired stiffness characteristics for the resilient seals 130, for example the spring constant "K" in the radial direction. The functional characteristics of the resilient seals 130 may be further tuned and optimized by combining a spring (not shown) in series with each of the resilient seals 130.

As schematically shown in FIGS. 2, 3 and 4 for example, the support pin 96 includes at least a first oil feed hole 961 extending through the support pin 96 between the inner surface 125 (FIGS. 2 and 4) and the outer surface 101 of the support pin 96. As mentioned above and schematically shown in FIG. 3 for example, each oil feed hole 961 defines an exit opening 962 at the outer surface of the support pin 102, wherein the exit opening 962 of the each oil feed hole 961 is disposed in fluid communication with the annular gap of the squeeze film damper. The dimension of the annular gap at any point around the circumference of the squeeze film damper depends upon the oil pressure, the degree of compression of the resilient seals 130 and the deflection of the inner ring 102 in the radial direction toward the outer surface 101 of the support pin 96 that might be caused by various dynamic issues that may arise during operation of the power gearbox 46. However, the distance that the annular gap of the squeeze film damper measures in the radial direction typically is on the order of several thousandths of an inch, and thus the depiction of the relative size of the annular gap in FIG. 3 has been made larger than life and is merely a schematic representation made for the purpose of illustration only. As schematically represented by the arrows and thick black lines designated 1001 in FIG. 3, the flow of oil enters the annular gap of the squeeze film damper and provides damping to the planet bearing so as to mitigate dynamic issues that arise during operation of the power gearbox 46.

In the embodiment shown in FIG. 2 for example, the outer ring 84 of the planet gear desirably is a single-piece component that forms both the gear tooth surface 85 of the planet bearing and the cylindrical interior surface 103 that defines outer race of the planet bearing. The cylindrical interior surface 103 of the planet gear 84 of the planet bearing contacts and retains the rollers 104 of the planet bearing. Thus, in the embodiment shown in FIG. 2 for example, the outer cylindrical surface of the outer ring 84 of the planet bearing is defined by a gear tooth surface 85 that is configured to mesh with both the gear tooth surface 81 of the sun gear 80 and the gear tooth surface 87 of the ring gear 86.

However, in the embodiments shown in FIGS. 4, 5 and 6, the surface that contacts and retains the rollers 104 of the planet bearing is provided by a separate element than the element that is defined by a gear tooth surface 85 that is configured to mesh with both the gear tooth surface 81 of the sun gear 80 and the gear tooth surface 87 of the ring gear 86. As shown schematically in FIGS. 4, 5 and 6 for example, an outer ring 841 and a planet gear 842 of the planet bearing are two separate components that are non-rotatably connected together and disposed concentrically with respect to one another, though spaced apart from one another to define an annular gap that extends both radially and axially between the outer ring 841 and the planet gear 842.

As shown schematically in FIGS. 5 and 6 for example, the planet gear 842 defines an outer surface that defines a gear tooth surface 85 that is configured to mesh with the gear tooth surface 87 of the ring gear 86. Though the relationship between the planet gear 842 and the sun gear 80 is not depicted in the views of FIGS. 5 and 6, the gear tooth surface 85 of the planet gear 842 is configured so that it also meshes with the gear tooth surface 81 of the sun gear 80.

As shown in FIGS. 5 and 6 for example, the outer ring 841 defines an inner cylindrical surface 103 that is disposed facing toward the at least one track that is defined between each respective pair of guiderails 108 of the inner ring 102 (FIG. 4). The cylindrical interior surface 103 of the outer ring 841 of the planet bearing contacts and retains the rollers 104 of the planet bearing.

As shown schematically in FIGS. 5 and 6 for example, the planet gear 842 defines an inner surface 844 that is facing and opposed to an outer surface 843 of the outer ring 841. As shown in FIGS. 5 and 6, the outer surface 843 of the outer ring 841 desirably is cylindrical and is disposed facing toward the ring gear 86. As shown schematically in FIGS. 5 and 6 for example, the inner surface 844 of the planet gear 842 is disposed concentrically with respect to the outer surface 843 of the outer ring 841, though spaced apart a small distance measured in the radial direction and extending in the axial direction for substantially most of the axial length of the outer ring 841 to define an annular gap therebetween. Thus, in the embodiment shown in FIGS. 4, 5 and 6, an annular gap that extends both radially and axially between the outer surface 843 of the outer ring 841 and the inner surface 844 of the planet gear 842 of the planet bearing is provided between the outer ring 841 and the planet gear 842 of the planet bearing. The annular gap is shown more dramatically in FIG. 6 than in FIG. 5 where the bold arrows are disposed within this annular gap in the schematic representation of FIG. 5.

Furthermore, in the embodiments shown in FIGS. 4, 5 and 6, the planet gear 842 is non-rotatably connected to the outer ring 841. In the embodiments shown in FIGS. 4, 5 and 6, the element that non-rotatably connects the outer ring 841 and the planet gear 842 of the planet bearing together is represented schematically by the structure that is designated by the numeral 83. This connecting mechanism 83 can take any of a number of conventional implementations. Accordingly, the connecting mechanism 83 can be provided by mechanical fasteners that can include a spring finger housing for example, or not, as desired, depending upon the particular application.

In the embodiments shown in FIGS. 4 and 5, a squeeze film damper is disposed between the outer surface 843 of the outer ring 841 and the inner surface 844 of the planet gear 842. Referring to the embodiments depicted in FIGS. 4 and 5, the forward end 8421 of the planet gear 842 is defined by a forward groove 8423 that extends circumferentially with respect to the virtual central axis 106 (FIG. 4) and forms the forward end of the squeeze film damper that is disposed between the outer surface 843 of the outer ring 841 and the inner surface 844 of the planet gear 842. Similarly, the aft end 8422 of the planet gear 842 is defined by an aft groove 8424 that extends circumferentially with respect to the virtual central axis 106 (FIG. 4) and forms the aft end of the squeeze film damper that is disposed between the outer surface 843 of the outer ring 841 and the inner surface 844 of the planet gear 842. As shown in FIG. 5, each of the forward groove 8423 and the aft groove 8424 defines a radial depth that extends from the inner surface 844 of the planet gear 842 in a direction radially away from the virtual central axis 106 (FIG. 4) of the planet bearing.

Alternatively, the forward groove and the aft groove can be defined in the outer surface 843 of the outer ring 841 instead of the inner surface 844 of the planet gear 842 to comparable effect.

As shown in FIG. 5, the squeeze film damper further includes a forward resilient seal 130 disposed within the forward groove 8423 and an aft resilient seal 130 disposed within the aft groove 8424. The structure and function of these resilient seals 130 already are explained above in connection with the embodiment depicted in FIG. 3 for example, and thus need not be repeated. As noted above in connection with FIG. 3, the distance that the annular gap of the squeeze film damper measures in the radial direction typically is on the order of several thousandths of an inch, and thus the depiction of the relative size of the annular gap in FIG. 5 has been made larger than life and is merely a schematic representation made for the purpose of illustration only.

As schematically shown by the arrow designated by the numeral 82 in FIG. 5, in the embodiment of FIG. 5, the squeeze film damper is provided with the oil by at least one oil feed hole 82 that extends through the outer ring 841 between the cylindrical inner surface 103 and the cylindrical outer surface 843 of outer ring 841, desirably extending in a radial direction. Though the cross-sectional view of FIG. 5 shows only a single oil feed hole 82, desirably a plurality can be provided circumferentially around the outer ring 841 of planet bearing. As schematically shown in FIG. 5 for example, each oil feed hole 82 defines an exit opening 821 at the outer surface 843 of outer ring 841. As schematically represented by the arrows and thick black lines designated 822 in FIG. 5, the flow of oil takes a path that flows out of the exit openings 962 (see FIG. 3) and into the annular gap of the squeeze film damper and spreads axially in the direction in which the arrows 822 are pointing as well as circumferentially to fill the annular gap of the squeeze film damper and thus provides damping to the planet bearing so as to mitigate dynamic issues that arise during operation of the power gearbox 46. These oil feed holes 82 are sized to meter a controlled flow of oil for lubricating and cooling the planet bearing as well as for damping anticipated dynamic issues that may arise in the planet bearings during operation of the power gearbox 46.

Moreover, the squeeze film damper would be provided with at least one oil bleed passage that permits circulation of the oil from within the annular gap and past at least one of the resilient seals 130 and back into the oil sump to be re-pressurized and recirculated. Though not depicted in any of the views shown, an oil bleed passage desirably can be defined as a bore extending through a resilient seal 130 or as a groove defined around the outer surface of a resilient seal 130. Naturally, each such oil bleed passage would be sized so as to be certain to maintain adequate pressure within the annular gap.

In the embodiments shown in FIGS. 4 and 6, instead of a squeeze film damper, an attenuation spring 140 is disposed between the outer surface 843 of the outer ring 841 and the inner surface 844 of the planet gear 842. Thus, the attenuation spring 140 is disposed within the annular gap that is defined between the outer surface 843 of the outer ring 841 and the inner surface 844 of the planet gear 842.

The view shown in FIG. 6 is a cross-section in which the cutting plane extends in both a radial direction and an axial direction that is normal to the radial direction and thus only shows a transverse cross-sectional view of the attenuation spring 140, which extends 360° in the circumferential direction. Any material with appropriate stiffness and fatigue life may be used to construct the attenuation spring 140. The attenuation spring 140 need only have a cross-sectional shape which provides a resilient characteristic in the radial direction. Some alternative examples to the attenuation spring 140 with the cross-section depicted in FIG. 6 include those having a cross-section with either "Z", "C", "I", or "T" shapes. The diameter of the attenuation spring 140 as well as the geometry of the attenuation spring's cross section, such as the wall thickness, angle of the webs, fillet radii, etc., may be selected to provide desired stiffness characteristics for the attenuation spring 140, for example the spring constant "K" in the radial direction.

In the embodiment shown in shown in FIGS. 2, 3, 4, 5 and 6 for example, a plurality of cylindrical rollers 104 is disposed between the inner ring 102 and the cylindrical interior surface 103 of the planet gear 84 or outer ring 841 that serves as the outer race of the planet bearing. As schematically shown in FIG. 3 for example, each of the pair of tracks in the inner ring 102 is configured to receive and rotatably guide therein a respective plurality of cylindrical rollers 104, which are free to rotate relative to both the inner raceways 107, 109 and the outer race of the planet bearing.

Thus, in the dual track embodiment of the inner ring 102, the raceways 107, 109 of the inner ring 102 receive rollers 104, in two tandem rings. A first plurality of cylindrical rollers 104 is rotatably disposed on the forward raceway 107 within a first one of the pair of tracks of the inner ring 102. Similarly, a second plurality of cylindrical rollers 104 is rotatably disposed on the aft raceway 109 within a second one of the pair of tracks of the inner ring 102. Thus, the raceways 107, 109 of the inner ring 102 contact a portion of each of the cylindrical outer surfaces 114 of the cylindrical rollers 104 disposed in the respective track. The cylindrical rollers 104 can comprise a ceramic material of a known composition, for example silicon nitride ($Si_3Ni_4$).

In the exemplary dual track embodiment of the inner-race-guided planet gearbox illustrated in the FIGs., two separate roller cages desirably are disposed between the inner ring 102 and the outer ring 84. Each roller cage is free to rotate with respect to both the inner ring 102 and the outer ring 84, but at a different speed than the speed of rotation of the outer ring 84. In the embodiment schematically shown in FIG. 3 for example, because the inner ring 102 has side-by-side dual tracks, a separate roller cage is provided over each of the dual tracks. Each roller cage defines its own circumferential row of generally rectangular openings disposed above a respective track of the pair of tracks of the inner ring 102.

Each circumferential row in each roller cage defines a plurality of generally rectangular openings. As schematically shown in FIGS. 2 and 4, each generally rectangular opening of each roller cage is bounded by a parallel pair of opposing and spaced apart web elements 120 that elongate in the axial direction. As shown in FIGS. 2, 3, 4, 5 and 6 for example, each generally rectangular opening of the roller cage is bounded by a pair of opposing, parallel and spaced apart siderails 118 that elongate in the circumferential direction. As shown in FIGS. 2 and 4 for example, respective web elements 120 of each roller cage are disposed to extend axially between the opposing shoulder elements 118 of the roller cage. All of the webs 120 of both roller cages are identically configured and dimensioned. Each roller cage is configured to maintain in each respective track with its respective raceway 107, 109 of the inner ring 102, a respective separation in the circumferential direction between each respective cylindrical roller 104 in each pair of circumferentially adjacent cylindrical rollers 104 in that respective track.

As shown in FIGS. 3, 5 and 6 for example, each respective siderail 118 of each roller cage is disposed above a respective guiderail 108 of the inner ring 102 with a close clearance between the two respective opposing surfaces of the siderail 118 and the guiderail 108. Because the planet bearing desirably is inner-race-guided, the roller cage is designed with a close clearance between the cylindrically-shaped, circumferential inner surface defined by the siderail 118 of the cage and the cylindrically-shaped, circumferential outer surfaces 128 of the guiderails 108 of the inner ring 102, and this close clearance desirably is on the order of 0.005 to 0.050 inches inclusive.

FIGS. 3 and 5 are schematic representations of possible paths for the flow of lubricating oil from the support pin 96 through the planet gear of embodiments of the planet gearbox. In FIGS. 3 and 5, the heavy solid lines schematically represent the path that the oil takes for damping, lubrication and cooling purposes.

For the embodiment depicted, the planet roller bearing may be formed of any suitable material. For example, in at least certain exemplary embodiments, the roller bearing may be formed of a suitable metal material, such as a chrome steel or a high carbon chrome steel. Alternatively, in other exemplary embodiments, the planet roller bearing may include one or more components formed of a suitable ceramic material.

Each of the above exemplary embodiments of the present disclosure adds damping to the system in a very compact and efficient manner by incorporating the squeeze film damper or the attenuation spring 140 directly into the planet bearing itself. The squeeze film damper embodiments provide a sealing function with a centering function for the bearing, and the grooves can be machined with standard machining processes, thus rendering the system less expensive than other ways of improving the bearing's dynamic tolerance capacity. The attenuation spring embodiments have the further advantage of eliminating the step of machining the grooves. Each of these embodiments maximizes the bearing's dynamic tolerance capability to maximize the bearing's load capacity, reliability and useful life without compromising the effectiveness of the lubrication and cooling of the planet bearing. Thus, each embodiment lengthens the duration of time that the engine 10 can remain in active service.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims. For instance, features illustrated or described as part of one embodiment may be used on another embodiment to yield a still further embodiment.

While specific embodiments of the present invention have been described, it will be apparent to those skilled in the art that various modifications thereto can be made without departing from the spirit and scope of the invention. Accordingly, the foregoing description of the preferred embodiment of the invention and the best mode for practicing the invention are provided for the purpose of illustration only and not for the purpose of limitation.

What is claimed is:

1. A planet gearbox for connection to a carrier of an epicyclic gearing arrangement that has only a single input and a single output and that includes a ring gear surrounding planet gears and a sun gear, the planet gearbox comprising:
   a support pin is configured to be fixed to the carrier, the support pin includes a hollow body that is defined by a cylindrical outer surface that is radially equidistant from a virtual central axis that extends in an axial direction, the support pin is further defined by an inner surface disposed opposite the cylindrical outer surface;
   an inner ring is non-rotatably connected to the support pin and defines an inner surface opposed to the outer surface of the support pin, the inner ring defining an outer surface that defines at least one track, said at least one track defined in the outer surface being configured to receive and rotatably guide therein a plurality of cylindrical rollers; wherein the inner ring is defined by a forward end and an aft end that is spaced axially apart from the forward end, the squeeze film damper includes a forward grove defined in the forward end of the inner ring and extending circumferentially with respect to the virtual central axis; an outer ring defines;

an inner cylindrical surface that is disposed facing toward the at least one track, the outer ring defining an outer cylindrical surface that defines a gear tooth surface that is disposed facing toward the ring gear and that is configured to mesh with both the sun gear and the ring gear;

the respective plurality of cylindrical rollers rotatably disposed within said at least one track of the inner ring, and each of the plurality of cylindrical rollers rotatably contacting the inner cylindrical surface of the outer ring; and a squeeze film damper disposed between the outer surface of the support pin and the inner surface of the inner ring.

2. The planet gearbox of claim 1, wherein the support pin includes at least a first oil feed hole extending through the support pin between the inner surface of the support pin and the outer surface of the support pin and defining an exit opening at the outer surface of the support pin, wherein the exit opening of the first oil feed hole is disposed in fluid communication with the squeeze film damper.

3. The planet gearbox of claim 1, wherein the squeeze film damper includes an annular gap that extends between the cylindrical outer surface of the support pin and the inner surface of the inner ring.

4. The planet gearbox of claim 3, wherein the support pin includes at least a first oil feed hole extending through the support pin between the inner surface of the support pin and the outer surface of the support pin and defining an exit opening at the outer surface of the support pin, wherein the exit opening of the first oil feed hole is disposed in fluid communication with the annular gap.

5. The planet gearbox of claim 1, wherein the forward groove defines a radial depth that extends from the inner surface of the inner ring in a direction radially away from the virtual central axis, and the squeeze film damper further includes a forward resilient seal disposed within the forward groove, the forward resilient seal defining an inner diameter and an outer diameter that is larger than the inner diameter such that the difference between the inner diameter and the outer diameter defines an uncompressed thickness of the forward resilient seal, and the uncompressed thickness of the forward resilient seal is greater than the radial depth of the forward groove.

6. The planet gearbox of claim 5, wherein the squeeze film damper includes an annular gap that is defined between the cylindrical outer surface of the support pin and the inner surface of the inner ring and wherein the squeeze film damper includes a resilient forward toroidal seal at a forward end of the annular gap and a resilient aft toroidal seal at an aft end of the annular gap.

7. The planet gearbox of claim 5, wherein the squeeze film damper includes an aft groove defined in the aft end of the inner ring and extending circumferentially with respect to the virtual central axis, the aft groove defines a radial depth that extends from the inner surface of the inner ring in a direction radially away from the virtual central axis, and the squeeze film damper further includes an aft resilient seal disposed within the aft groove, the aft resilient seal defining an inner diameter and an outer diameter that is larger than the inner diameter such that the difference between the inner diameter and the outer diameter of the aft resilient seal defines an uncompressed thickness of the aft resilient seal, and the uncompressed thickness of the aft resilient seal is greater than the radial depth of the aft groove.

8. The planet gearbox of claim 7, wherein the squeeze film damper includes an annular gap that extends between the cylindrical outer surface of the support pin and the inner surface of the inner ring in a direction radially away from the virtual central axis and wherein the dimension of the annular gap at any point around a circumference of the squeeze film damper depends upon the degree of compression of the resilient seals.

9. The planet gearbox of claim 7, wherein each of the resilient forward seal and the resilient aft seal is a toroidal seal.

10. A gas turbine engine comprising:
a fan including a plurality of blades extending radially from a hub and rotatable about a first axis of rotation defined centrally through the hub;
a compressor disposed downstream from the fan;
a turbine disposed downstream of the compressor;
a rotatable input shaft mechanically coupling the compressor to rotate in unison with the turbine;
an epicyclic gearing arrangement that has only a single input and that includes a carrier, a sun gear rotatable about a second axis of rotation that is parallel to the first axis of rotation, a ring gear disposed circumferentially around the sun gear, at least one planet gearbox that is carried by the carrier and houses a planet gear rotatable with respect to the carrier about a third axis of rotation that is parallel to the second axis of rotation, wherein the at least one planet gear meshes with both the sun gear and the ring gear; and
an engine envelope surrounding the fan, the compressor, the turbine and the epicyclic gearing arrangement, wherein one of the ring gear and the carrier is non-rotatably coupled to the engine envelope; and
the planet gearbox further including:
a support pin is configured to be fixed to the carrier, the support pin includes a hollow body that is defined by a cylindrical outer surface that is radially equidistant from a virtual central axis that extends in an axial direction, the support pin is further defined by an inner surface disposed opposite the cylindrical outer surface;
an inner ring is non-rotatably connected to the support pin and defines an inner surface opposed to the outer surface of the support pin, the inner ring defining an outer surface that defines at least one track, the at least one track defined in the outer surface being configured to receive and rotatably guide therein a plurality of cylindrical rollers; a planet gear defines an inner cylindrical surface that is disposed facing toward the at least one track, the planet gear defining an outer cylindrical surface that defines a gear tooth surface that is disposed facing toward the ring gear and that is configured to mesh with both the sun gear and the ring gear;
the plurality of cylindrical rollers rotatably disposed within the at least one track of the inner ring, and each of the plurality of cylindrical rollers rotatably contacting the inner cylindrical surface of the planet gear; and a squeeze film damper disposed between the outer surface of the support pin and the inner surface of the inner ring, wherein the squeeze film damper includes a resilient forward toroidal seal at a forward end of the annular gap and a resilient aft toroidal seal at an aft end of the annular gap.

11. The gas turbine engine of claim 10, wherein the support pin includes at least a first oil feed hole extending through the support pin between the inner surface of the support pin and the outer surface of the support pin and defining an exit opening at the outer surface of the support pin, wherein the exit opening of the first oil feed hole is disposed in fluid communication with the squeeze film damper.

12. The gas turbine engine of claim 10, wherein the squeeze film damper includes an annular gap that extends between the cylindrical outer surface of the support pin and the inner surface of the inner ring.

13. The gas turbine engine of claim 12, wherein the support pin includes at least a first oil feed hole extending through the support pin between the inner surface of the support pin and the outer surface of the support pin and defining an exit opening at the outer surface of the support pin, wherein the exit opening of the first oil feed hole is disposed in fluid communication with the annular gap.

14. The gas turbine engine of claim 10, wherein the inner ring is defined by a forward end and an aft end that is spaced axially apart from the forward end, the squeeze film damper includes a forward groove defined in the forward end of the inner ring and extending circumferentially with respect to the virtual central axis.

15. The gas turbine engine of claim 14, wherein the forward groove defines a radial depth that extends from the inner surface of the inner ring in a direction radially away from the virtual central axis, and the squeeze film damper further includes a forward resilient seal disposed within the forward groove, the forward resilient seal defining an inner diameter and an outer diameter that is larger than the inner diameter such that the difference between the inner diameter and the outer diameter defines an uncompressed thickness of the forward resilient seal, and the uncompressed thickness of the forward resilient seal is greater than the radial depth of the forward groove.

16. The gas turbine engine of claim 15, wherein the squeeze film damper includes an annular gap that is defined between the cylindrical outer surface of the support pin and the inner surface of the inner ring and wherein the squeeze film damper includes a resilient forward toroidal seal at a forward end of the annular gap and a resilient aft toroidal seal at an aft end of the annular gap.

17. The gas turbine engine of claim 15, wherein the squeeze film damper includes an aft groove defined in the aft end of the inner ring and extending circumferentially with respect to the virtual central axis, the aft groove defines a radial depth that extends from the inner surface of the inner ring in a direction radially away from the virtual central axis, and the squeeze film damper further includes an aft resilient seal disposed within the aft groove, the aft resilient seal defining an inner diameter and an outer diameter that is larger than the inner diameter such that the difference between the inner diameter and the outer diameter of the aft resilient seal defines an uncompressed thickness of the aft resilient seal, and the uncompressed thickness of the aft resilient seal is greater than the radial depth of the aft groove.

18. The gas turbine engine of claim 17, wherein the squeeze film damper includes an annular gap that extends between the cylindrical outer surface of the support pin and the inner surface of the inner ring in a direction radially away from the virtual central axis and wherein the dimension of the annular gap at any point around a circumference of the squeeze film damper depends upon the degree of compression of the resilient seals.

* * * * *